US011347911B2

(12) United States Patent
Witowski et al.

(10) Patent No.: US 11,347,911 B2
(45) Date of Patent: May 31, 2022

(54) SYSTEMS AND METHODS OF DETERMINING A NUMERICAL MATERIAL MODEL THAT OPTIMALLY EMULATES PHYSICAL MATERIAL TEST RESULTS

(71) Applicant: Livermore Software Technology Corporation, Livermore, CA (US)

(72) Inventors: Katharina Witowski, Rutesheim (DE); Nielen Stander, Pleasanton, CA (US); Anirban Basudhar, Livermore, CA (US)

(*) Notice: Subject to any disclaimer, the term of this patent is extended or adjusted under 35 U.S.C. 154(b) by 178 days.

(21) Appl. No.: 16/573,052

(22) Filed: Sep. 17, 2019

(65) Prior Publication Data

US 2021/0034713 A1 Feb. 4, 2021

Related U.S. Application Data

(60) Provisional application No. 62/880,565, filed on Jul. 30, 2019.

(51) Int. Cl.
*G06F 30/23* (2020.01)
*G06F 111/10* (2020.01)

(52) U.S. Cl.
CPC .......... *G06F 30/23* (2020.01); *G06F 2111/10* (2020.01)

(58) Field of Classification Search
CPC .......... G06F 30/23; G10L 15/22; G06N 20/00
See application file for complete search history.

(56) References Cited

U.S. PATENT DOCUMENTS

| 10,614,436 | B1* | 4/2020 | Sharma | G06Q 30/0201 |
| 2014/0095132 | A1* | 4/2014 | Fu | G06F 17/18 703/6 |
| 2016/0328503 | A1* | 11/2016 | Zhu | G06F 30/23 |
| 2018/0173813 | A1* | 6/2018 | Spiro | G06F 30/20 |

OTHER PUBLICATIONS

Jekel, Charles F., et al. "Similarity measures for identifying material parameters from hysteresis loops using inverse analysis." International Journal of Material Forming 12.3 (2019): 355-378. (Year: 2019).*

(Continued)

*Primary Examiner* — Boris Gorney
*Assistant Examiner* — David A Hopkins

(57) ABSTRACT

A reference curve representing measured stress-strain data obtained in a material test of a specimen is received. FEA model is created to represent the specimen which is associated with numerical material properties defined by a formula having a set of adjustable coefficients. Multiple computed curves are obtained each defined with multiple nodes of computed stress-strain values by conducting a time-marching simulation of the material test using the FEA model with a set of unique coefficients. Respective curve difference measurement parameters are calculated between each computed curve and the reference curve using a similarity measure technique that includes trimming off excess end portion of each computed curve so as to match the reference curve. Optimal values of the adjustable coefficients are determined by estimating a minimum of the curve difference measurement parameters according to an optimization technique.

9 Claims, 12 Drawing Sheets

(56) References Cited

OTHER PUBLICATIONS

Seto, Skyler, Wenyu Zhang, and Yichen Zhou. "Multivariate time series classification using dynamic time warping template selection for human activity recognition." 2015 IEEE Symposium Series on Computational Intelligence. IEEE, 2015. (Year: 2015).*

Mueen, Abdullah, and Eamonn Keogh. "Extracting optimal performance from dynamic time warping." Proceedings of the 22nd ACM SIGKDD International Conference on Knowledge Discovery and Data Mining. 2016. (Year: 2016).*

Arribas-Gil, Ana, and Hans-Georg Müller. "Pairwise dynamic time warping for event data." Computational Statistics & Data Analysis 69 (2014): 255-268. (Year: 2014).*

Efrat, Alon, Quanfu Fan, and Suresh Venkatasubramanian. "Curve matching, time warping, and light fields: New algorithms for computing similarity between curves." Journal of Mathematical Imaging and Vision 27.3 (2007): 203-216. (Year: 2007).*

Gins, Geert, Pieter Van den Kerkhof, and Jan FM Van Impe. "Hybrid derivative dynamic time warping for online industrial batch-end quality estimation." Industrial & engineering chemistry research 51.17 (2012): 6071-6084 (Year: 2012).*

Husain, Asif, D. K. Sehgal, and R. K. Pandey. "An inverse finite element procedure for the determination of constitutive tensile behavior of materials using miniature specimen." Computational Materials Science 31.1-2 (2004): 84-92. (Year: 2004).*

Munich, Mario E., and Pietro Perona. "Continuous dynamic time warping for translation-invariant curve alignment with applications to signature verification." Proceedings of the Seventh IEEE International Conference on Computer Vision. vol. 1. IEEE, 1999. (Year: 1999).*

Thi-Thu-Hong Phan, B., Emilie Poisson Caillault, and André Bigand. "eDTWBI: Effective Imputation Method for Univariate Time Series." Advanced Computational Methods for Knowledge Engineering: Proceedings of the 6th International Conference on Computer Science (Year: 2019).*

Tao, Hong, Nian Zhang, and Wei Tong. "An iterative procedure for determining effective stress-strain curves of sheet metals." International Journal of Mechanics and Materials in Design 5.1 (2009): 13-27. (Year: 2009).*

Witowski et al., "Modified Dynamic Time Warping for Utilizing Partial Curve Data to Calibrate Material Models", 2020 (Year: 2020).*

Stander, Nielen, et al. "Application of Digital Image Correlation to Material Parameter Identification using LS-OPT®." (2017). (Year: 2017).*

Witowski, Katharina, Markus Feucht, and Nielen Stander. "An effective curve matching metric for parameter identification using partial mapping." 8th European LS-DYNA, Users Conference Strasbourg, pp. 2011. (Year: 2011).*

Ilg, Christian, et al. "Application of a Full-Field Calibration Concept for Parameter Identification of HS-Steel with LS-OPT®." 15th international LS-Dyna users conference. vol. 6. 2018. (Year: 2018).*

Du Bois, Sophie, et al. "An LS-OPT® methodology for utilizing partial curve data for the calibration of material models." Proceedings of the 12th European LS-DYNA Conference 2019, Koblenz, Germany. 2019. (Year: 2019).*

Giorgino, Toni. "Computing and visualizing dynamic time warping alignments in R: the dtw package." Journal of statistical Software 31.1 (2009): 1-24. (Year: 2009).*

Junkui, Li, and Wang Yuanzhen. "Early Abandon to Accelerate Exact Dynamic Time Warping." International Arab Journal of Information Technology (IAJIT) 6.2 (2009). (Year: 2009).*

Rui, Gao, et al. "Automatic template matching for classification of dolphin vocalizations." Oceans 2008—MTS/IEEE Kobe Techno—Ocean. IEEE, 2008. (Year: 2008).*

Silva, Diego F., and Gustavo EAPA Batista. "Speeding up all-pairwise dynamic time warping matrix calculation." Proceedings of the 2016 SIAM International Conference on Data Mining. Society for Industrial and Applied Mathematics, 2016. (Year: 2016).*

Tormene, Paolo, et al. "Matching incomplete time series with dynamic time warping: an algorithm and an application to post-stroke rehabilitation." Artificial intelligence in medicine 45.1 (2009): 11-34. (Year: 2009).*

\* cited by examiner

Numerical material model with Hockett-Sheby flow curve extrapolation $$f(\varepsilon_p) = A - Be^{-c\varepsilon_{pl}^n}$$

400

*c* and *n* are adjustable unknown coefficients

Create numerical connectors between R and C1. Average distance between R and C1 is the sum of connector lengths divided by the number of nodes = $(a+b+c+d+e+f+g)/7$ Create numerical connectors between R and C3. Again There is a redundant end connector remaining.

Trim C3 by discarding redundant end connector to get C4

Create numerical connectors between R and C5. The curves are now compatible and the final distance between the curves is $(f+g+h+i+j)/5$.

SYSTEMS AND METHODS OF DETERMINING A NUMERICAL MATERIAL MODEL THAT OPTIMALLY EMULATES PHYSICAL MATERIAL TEST RESULTS

CROSS-REFERENCE TO RELATED APPLICATIONS

This application claims benefits of a U.S. Provisional Patent Application Ser. No. 62/880,565 for "Systems and Methods Of Determining A Numerical Material Model That Optimally Emulates Physical Material Test Results", filed Jul. 30, 2019. The contents of which are hereby incorporated by reference in its entirety for all purposes.

FIELD

This patent document generally relates to computer-aided engineering analysis, more particularly to methods and systems for determining a numerical material model that optimally emulates physical material test results.

BACKGROUND

With advent of computer technology, computer aided engineering (CAE) analysis (e.g., finite element analysis (FEA)) have been used for assisting engineers/scientists to design products and manufacturing procedures in numerical simulations (e.g., time-marching simulation or time-domain analysis). In order to realistically simulate the physical structural behaviors, numerical material model needs to emulate such behaviors. For a practical numerical simulation (i.e., reasonable turnaround time, for example, overnight execution), various techniques have been used for reducing the execution time. One of such techniques is to use an equation or formula to calculate material properties. Generally, a formula representing non-linear material properties contains a set of unknown adjustable coefficients. It is very difficult for users (i.e., engineers, scientists, etc.) to guess the unknown coefficients so as to match the physical material test results. In additional to these unknown coefficients, material test results generally stop after specimen fails, while computation using the formula would create much more data.

SUMMARY

This section is for the purpose of summarizing some aspects of the invention and to briefly introduce some preferred embodiments. Simplifications or omissions in this section as well as in the abstract and the title herein may be made to avoid obscuring the purpose of the section. Such simplifications or omissions are not intended to limit the scope of the invention.

Systems and methods of determining a numerical material model optimally emulating material test results are described. According to one aspect of the disclosure, a reference curve representing measured stress-strain data obtained in a material test of a specimen is received. FEA model is created to represent the specimen which is associated with numerical material properties defined by a formula having a set of adjustable coefficients. Multiple computed curves are obtained each defined with multiple nodes of computed stress-strain values by conducting a time-marching simulation of the material test using the FEA model with a set of unique coefficients. Respective curve difference measurement parameters are calculated between each computed curve and the reference curve using a similarity measure technique that includes trimming off excess end portion of each computed curve so as to match the reference curve. Optimal values of the adjustable coefficients are determined by estimating a minimum of the curve difference measurement parameters according to an optimization technique.

In another aspect, the similarity measure technique further includes the following actions: creating an initial set of connectors between each node of the computed curve and a corresponding node of the reference curve based on criteria of the similarity measure technique; and determining whether the computed curve is compatible with the reference curve. When the computed curve is incompatible with the reference curve, (a) discarding all end connectors except innermost one at both ends of the reference curve; (b) redefining the computed curve by remeshing inner portion with nodes connected to at least one connector; (c) recreating a new set of connectors between each node of the computed curve and a corresponding node of the reference curve based on the criteria of the similarity measure technique; and repeating (a)-(c) until the computed curve is compatible with the reference curve. When the computed curve is compatible with the reference curve, calculating an average distance between the computed curve and the reference as the curve difference measurement parameter.

Objects, features, and advantages of the invention will become apparent upon examining the following detailed description of an embodiment thereof, taken in conjunction with the attached drawings.

BRIEF DESCRIPTION OF THE DRAWINGS

These and other features, aspects, and advantages of the invention will be better understood with regard to the following description, appended claims, and accompanying drawings as follows:

DETAILED DESCRIPTION

In the following description, numerous specific details are set forth in order to provide a thorough understanding of the invention. However, it will become obvious to those skilled in the art that the invention may be practiced without these specific details. The descriptions and representations herein are the common means used by those experienced or skilled in the art to most effectively convey the substance of their work to others skilled in the art. In other instances, well-known methods, procedures, and components have not been described in detail to avoid unnecessarily obscuring aspects of the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Additionally, used herein, the terms "horizontal", "vertical", "upper", "lower", "top", "bottom", "right", "left", "front", "back", "rear", "side", "middle", "upwards", and "downwards" are intended to provide relative positions for the purposes of description, and are not intended to designate an absolute frame of reference. Further, the order of blocks in process flowcharts or diagrams representing one or more embodiments of the invention do not inherently indicate any particular order nor imply any limitations in the invention.

Embodiments of the invention are discussed herein with reference to FIGS. 1-7. However, those skilled in the art will readily appreciate that the detailed description given herein with respect to these figures is for explanatory purposes as the invention extends beyond these limited embodiments.

Figure 1:
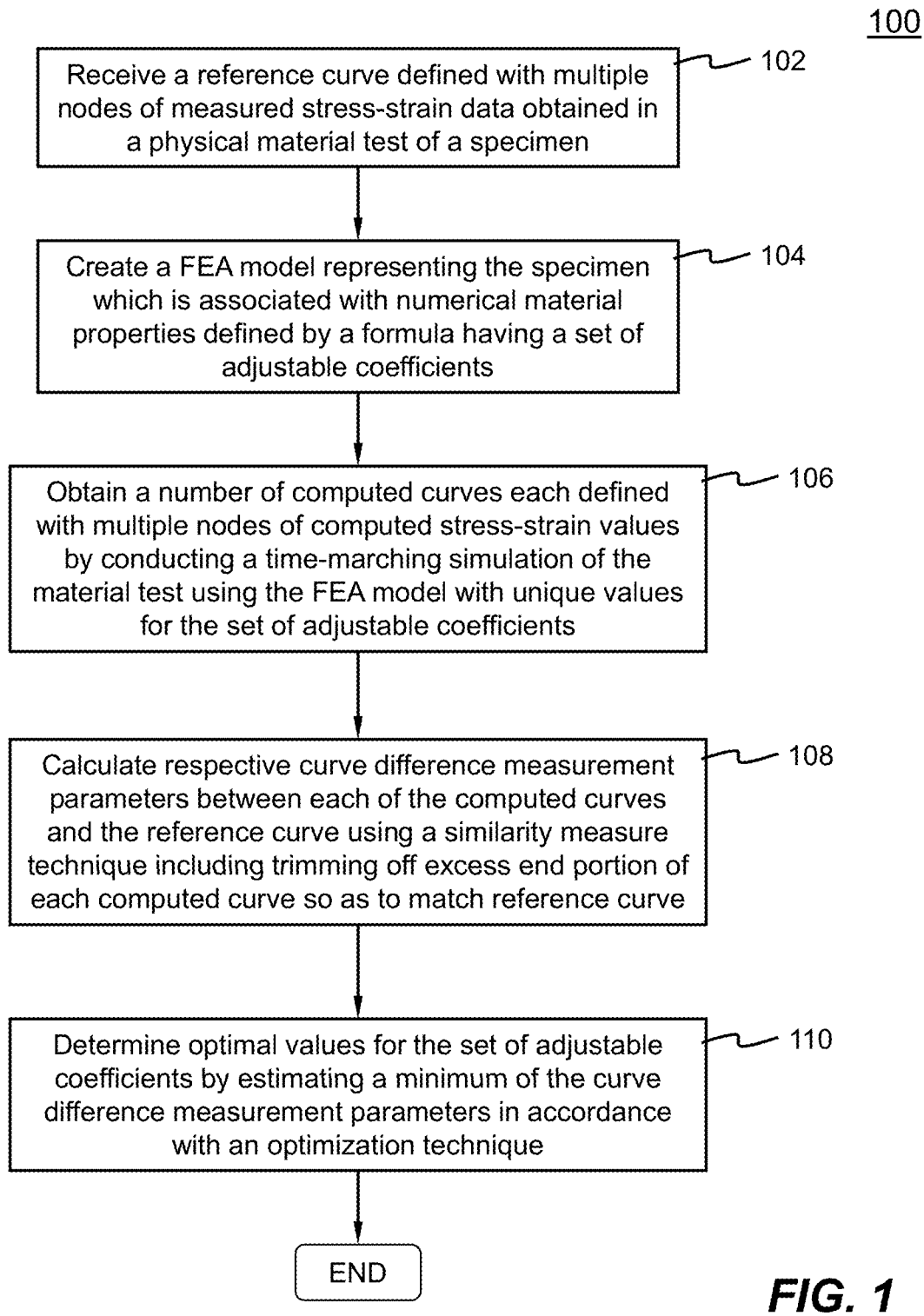
FIG. 1 is a flowchart illustrating an example process of determining a numerical material model that optimally emulates physical material test results, according to an embodiment of the invention.

Referring first to FIG. 1, it is shown a flowchart illustrating an example process 100 of determining a numerical material model that optimally emulates physical material test results. Process 100 is implemented in software.

Figure 3:
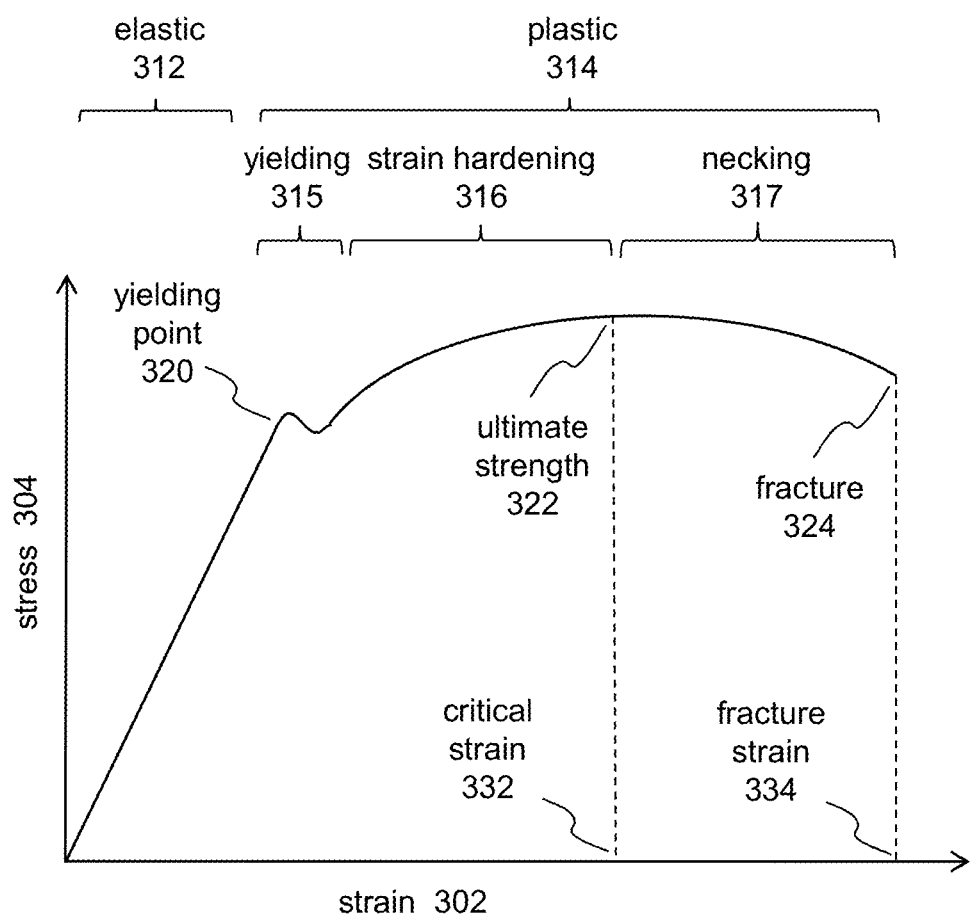
FIG. 3 is a diagram showing an example stress-strain plot of material test results.

Process 100 starts by receiving a reference curve defined by a number of nodes of measured stress-strain data obtained in a physical material test of a specimen in a computer system (e.g., computer system 700) having at least a finite element analysis (FEA) module installed thereon at action 102. An example stress-strain curve 300 is shown in FIG. 3. The curve 300 has a vertical axis representing stress 304 and a horizontal axis for strain 302. Material has two regions: elastic 312 and plastic 314. Plastic region 314 is further divided into three categories: yielding 315, strain hardening 316 and necking 317. At the top end of the elastic region of the stress-strain curve 300 is a yielding point 320, to which the yielding stress corresponds. The critical strain 332 corresponds to the ultimate strength point 322 and the fracture strain 334 corresponds to the fracture location 324. Generally, measured test data stops at the fracture location 324.

Figures 4, 5:
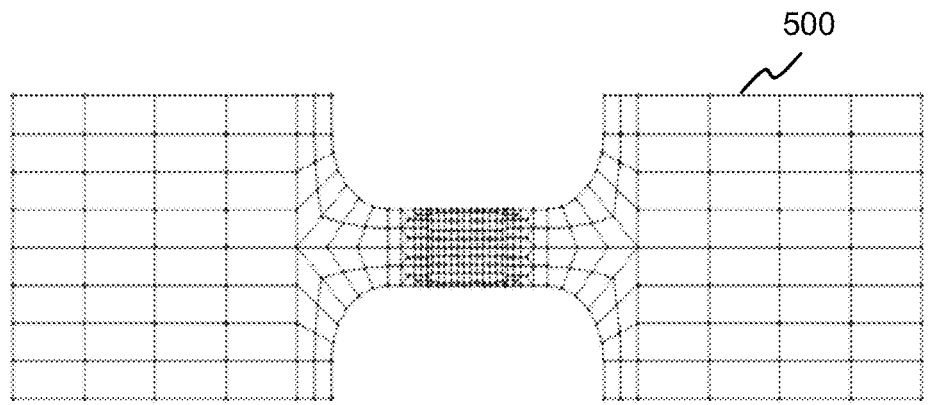
FIG. 4 is a diagram showing an example formula for defining material properties in accordance with one embodiment of the invention.
FIG. 5 is a diagram showing an example FEA model representing a specimen used in a physical material test according to one embodiment of the invention.

Then, at action 104, a FEA model representing the specimen is created with the application module. The FEA model is associated with numerical material properties defined by a formula which contains a set of adjustable unknown coefficients. An example FEA model 500 representing a specimen is shown in FIG. 5, while an example formula 400 that defines material properties is shown in FIG. 4. There are two adjustable unknown coefficients in the example formula 400. Other number of unknown coefficients may be used in other numerical material model.

Next, at action 106, each of multiple computed curves is obtained by conducting a time-marching simulation of the physical material test using the FEA model with unique values for the set of adjustable coefficients. Each computed curve is uniquely defined by a number of computed stress-strain values due to different adjustable coefficients used in the formula.

Figure 2:
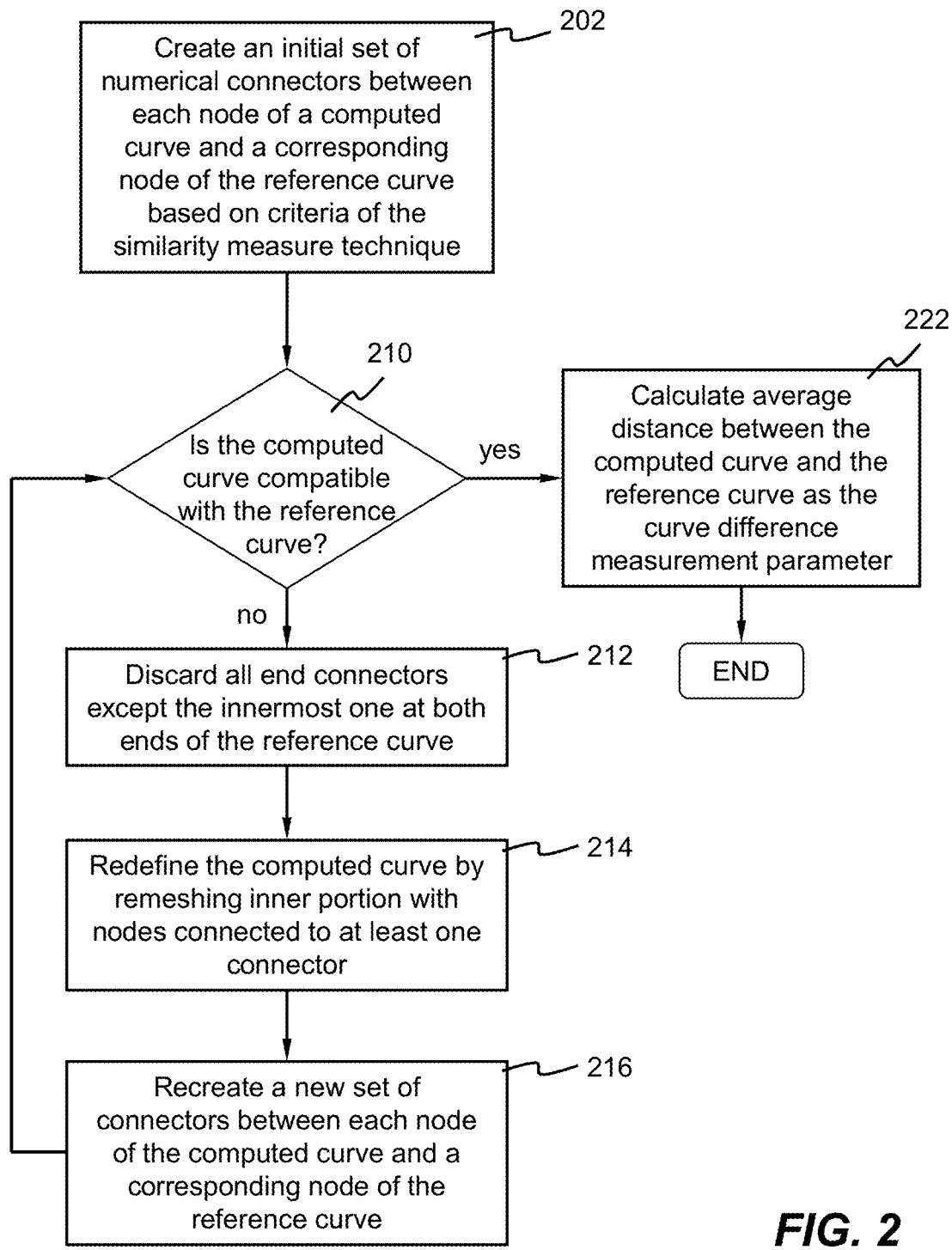
FIG. 2 is a flowchart illustrating an example process of matching a computed curve to a reference using a similarity measure technique in accordance with an embodiment of the invention.

At action 108, each computed curve is compared with the reference curve for calculating a curve difference measurement parameter using a similarity measure technique in additional to trimming off excess end portion of the computed curve so as to match the reference curve. A series of schematic diagrams shown in FIGS. 6A-6G illustrate an example procedure for calculating a curve difference measurement parameter. Also, FIG. 2 is a flowchart illustrating an example process 200 of matching a computed curve with the reference curve using a similarity measure technique. Process 200 is implemented in software.

Process 200 starts by creating an initial set of numerical connectors between each node of the computed curve and a corresponding node of the reference curve based on criteria of the similarity measure technique at action 202. Schematic diagram shown in FIG. 6A demonstrates a reference curve (R) 610 and a computed curve (C1) 621 with a set of connectors (shown dotted lines). Each node of the computed curve 621 is connected with a corresponding node on the reference curve 610. The criteria for creating the numerical connectors contains ensuring the shortest distance between the pair of nodes. For example, three interior nodes 632-634 of the reference curve 610 are all connected to the middle node 643 of the computed curve 621 because these three connectors are shortest path between respective pairs (i.e., node 632 and node 643, node 633 and node 643, node 634 and node 643).

Then, at decision 210, it is determined whether the computed curve is compatible with the reference curve. Term "compatible" used herein is defined for comparing two curves having no redundant end connector between them. Therefore, reference curve 610 and computed curve (C1) 621 are incompatible in FIG. 6A.

Figure 6A:
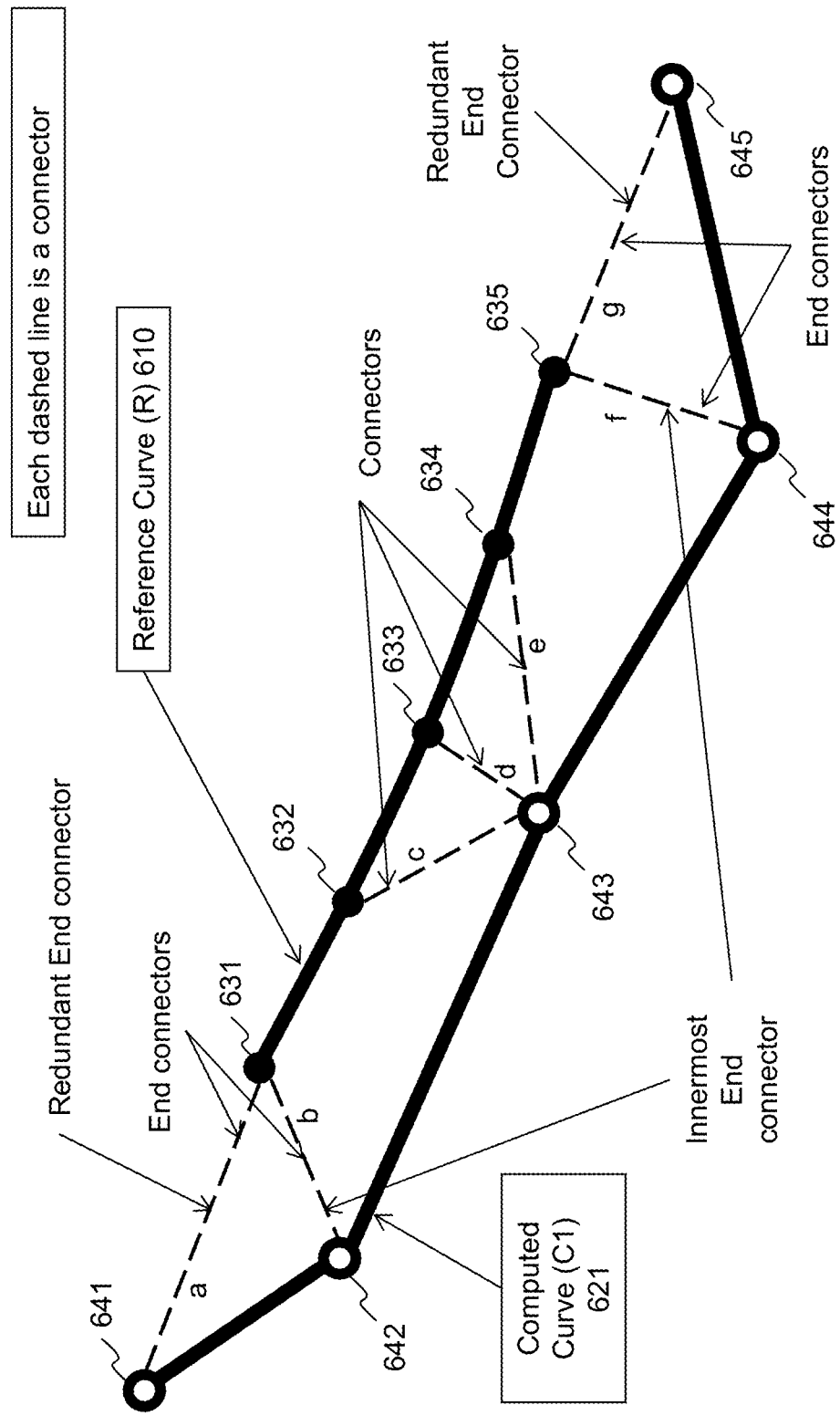
FIGS. 6A-6G are schematic diagrams showing an example procedure of matching a computed curve to a reference curve in accordance with one embodiment of the invention.
Figure 6B:
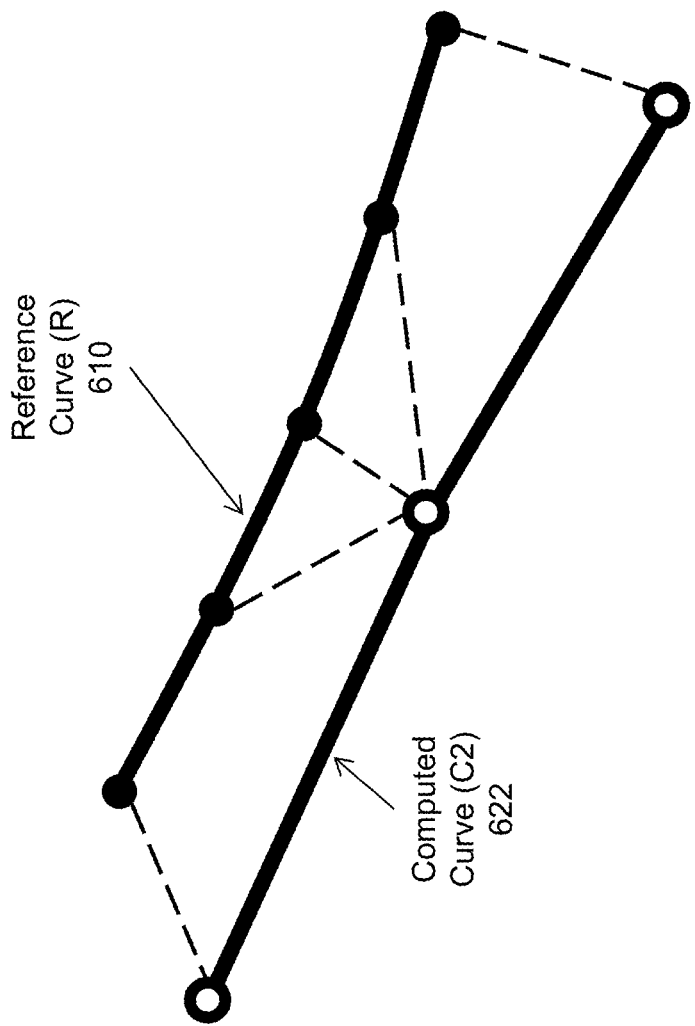
Figure 6C:
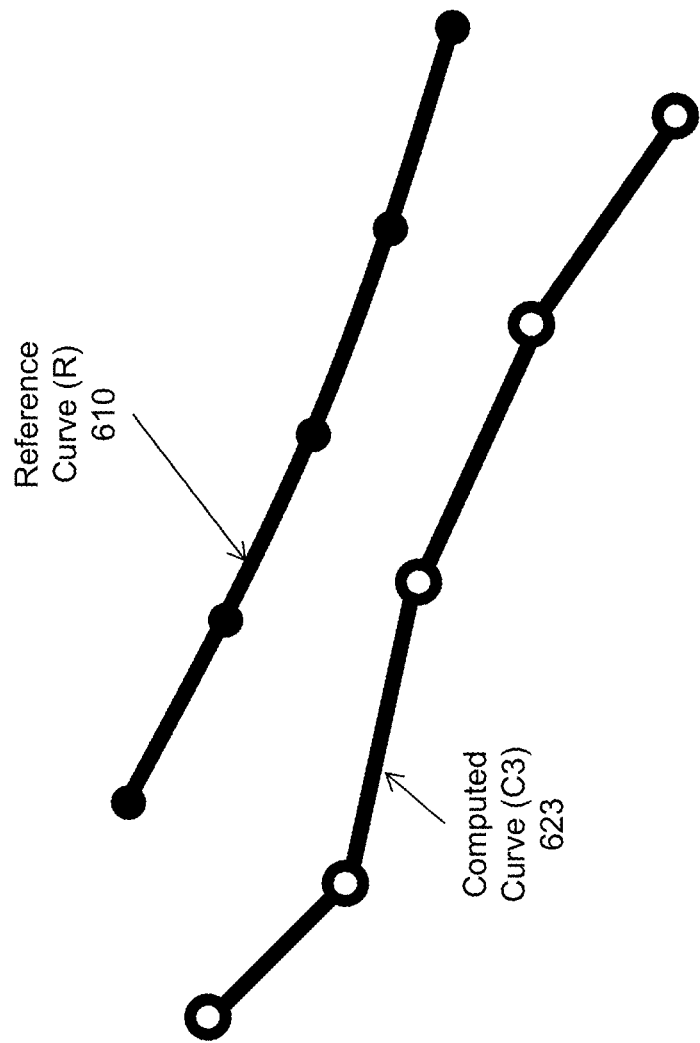
Figure 6D:
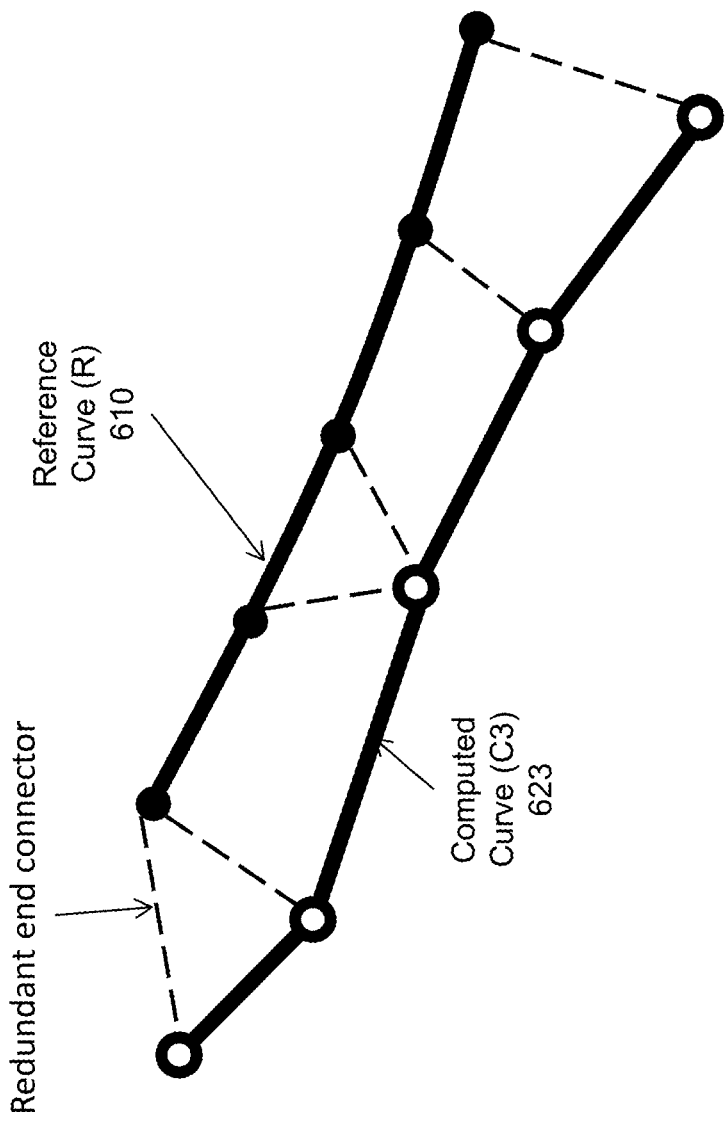

When the curves are incompatible, process 200 follows the 'no' branch to action 212 to discard all redundant end connectors except the innermost one at both ends of the reference curve 210. The resulting computed curve (C2) 622 is shown in FIG. 6B. Then, at action 214, the computed curve is redefined by remeshing the inner portion to the same number of nodes with the reference curve. There are a number of known techniques for remeshing, for example, placing nodes in equal distance. The inner portion of the computed curve is the portion with nodes connected to at least one connector. The remeshed computed curve (C3) 623 is shown in FIG. 6C. Next, at action 216, new set of numerical connectors are created between the remeshed computed curve and the reference curve based on the criteria of similarity measure technique. FIG. 6D shows the new set of connectors between the remeshed computed curve (C3) 623 and the reference curve 610. Process 200 moves back to decision 210 to determine whether the computed curve is compatible with the reference curve. The pair of curves shown in FIG. 6D are still incompatible. Therefore, process 200 repeats actions 212-216 until decision 210 becomes true (i.e., the curves are compatible). Process 200 then follows the 'yes' branch to action 222 for calculating average distance between the computed curve and the reference curve as the curve difference measurement parameter.

Figure 6E:
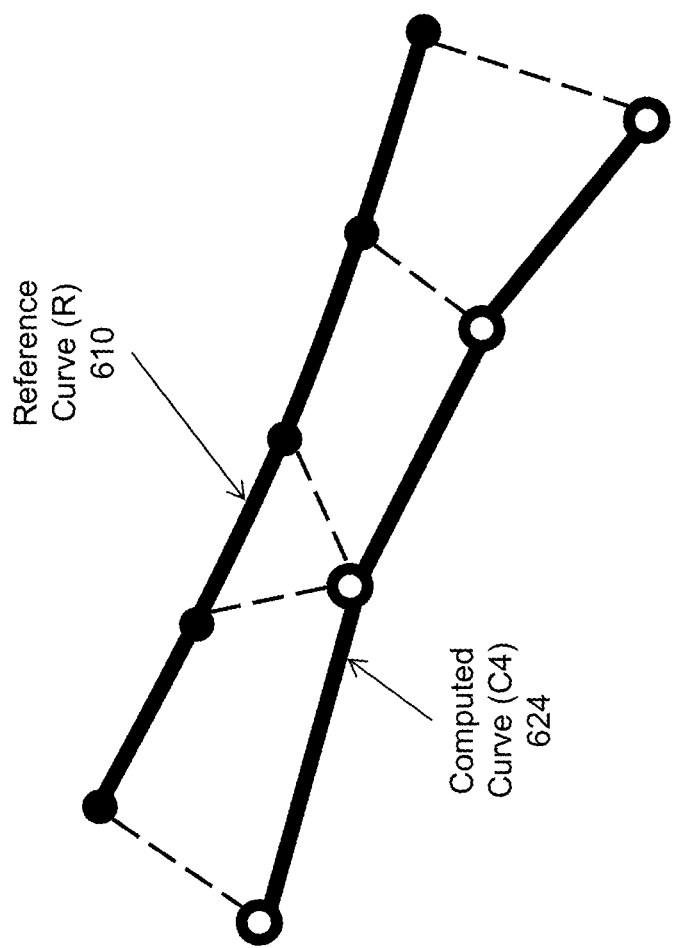
Figure 6F:
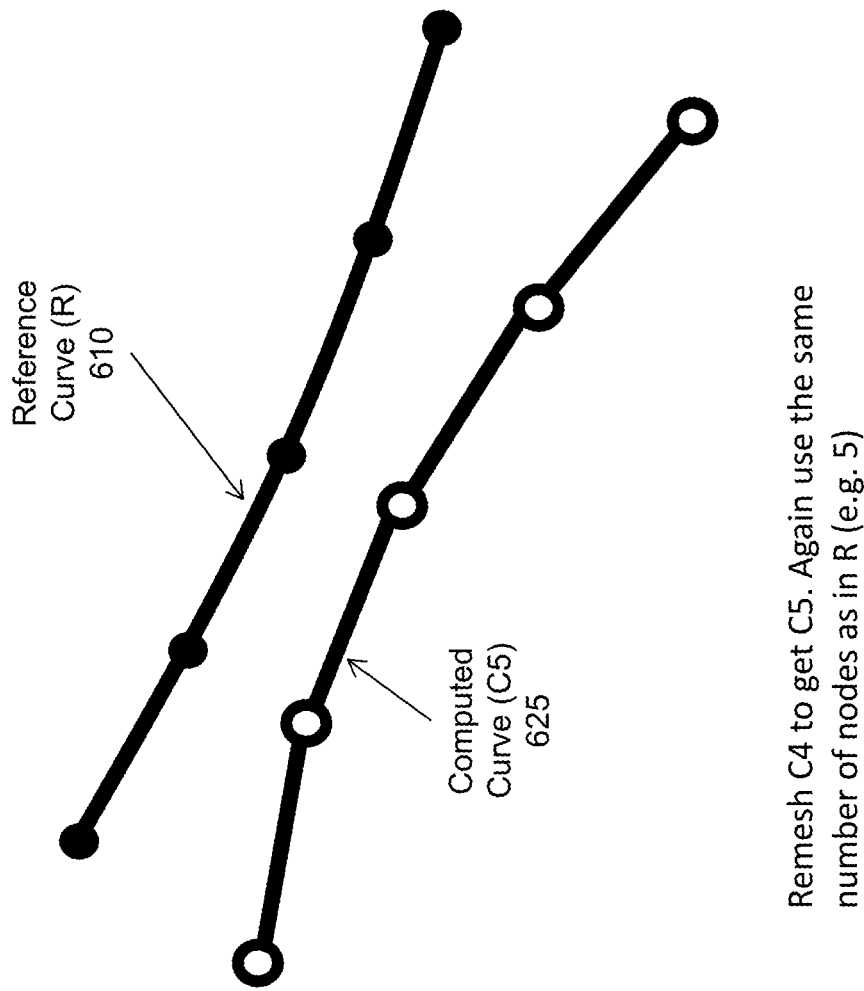
Figure 6G:
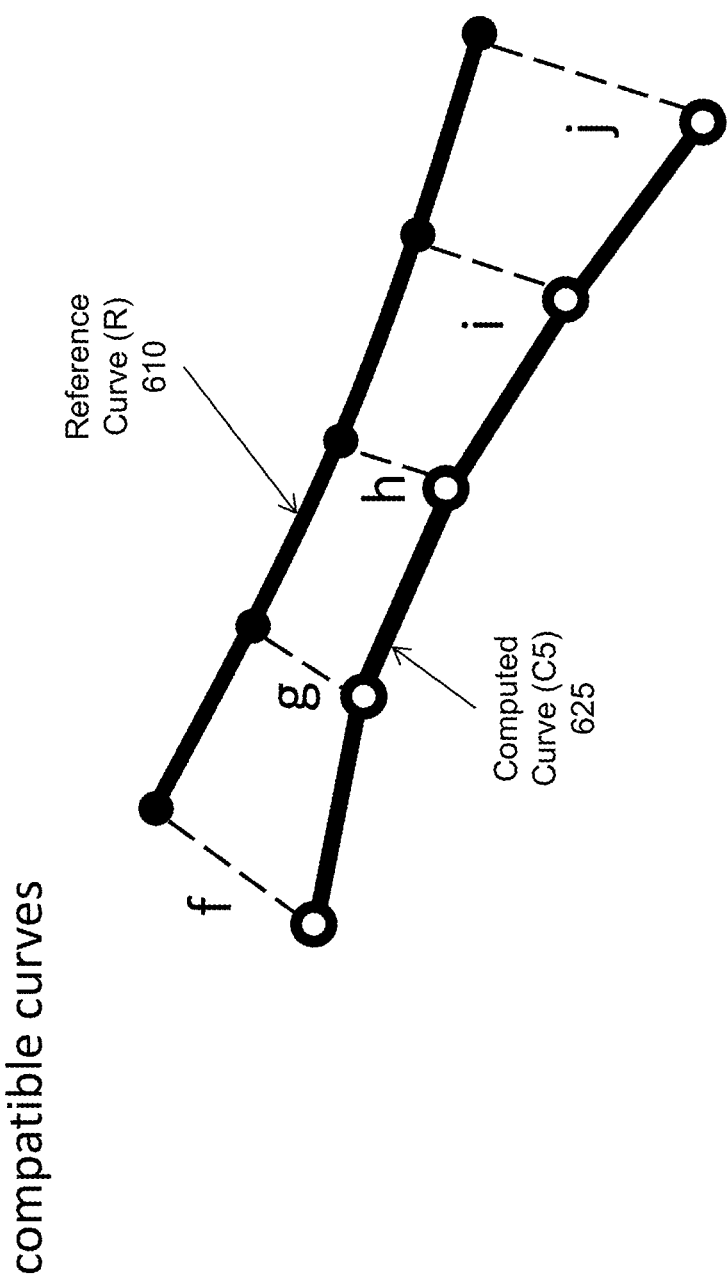

FIG. 6E shows another truncation of the computed curve (C4) 624. After remeshing inner portion of C4 624, the newly defined computed curve (C5) 625 is shown in FIG. 6F. The computed curve (C5) 625 is now compatible with the reference curve (R) 610 shown in FIG. 6G. The curve difference measurement parameter is set to be the average distance between the reference curve 610 and the computed curve 625. As shown in FIG. 6F, the average distance is the sum of the length of all connectors divided by the number of nodes.

Referring back to FIG. 1, at action 110, optimal values of the adjustable coefficients are determined by estimating a minimum of the curve difference measurement parameters in accordance with an optimization technique including, but not limited to, response surface method, genetic algorithm, Monte Carlo simulation, etc.

Figure 7:
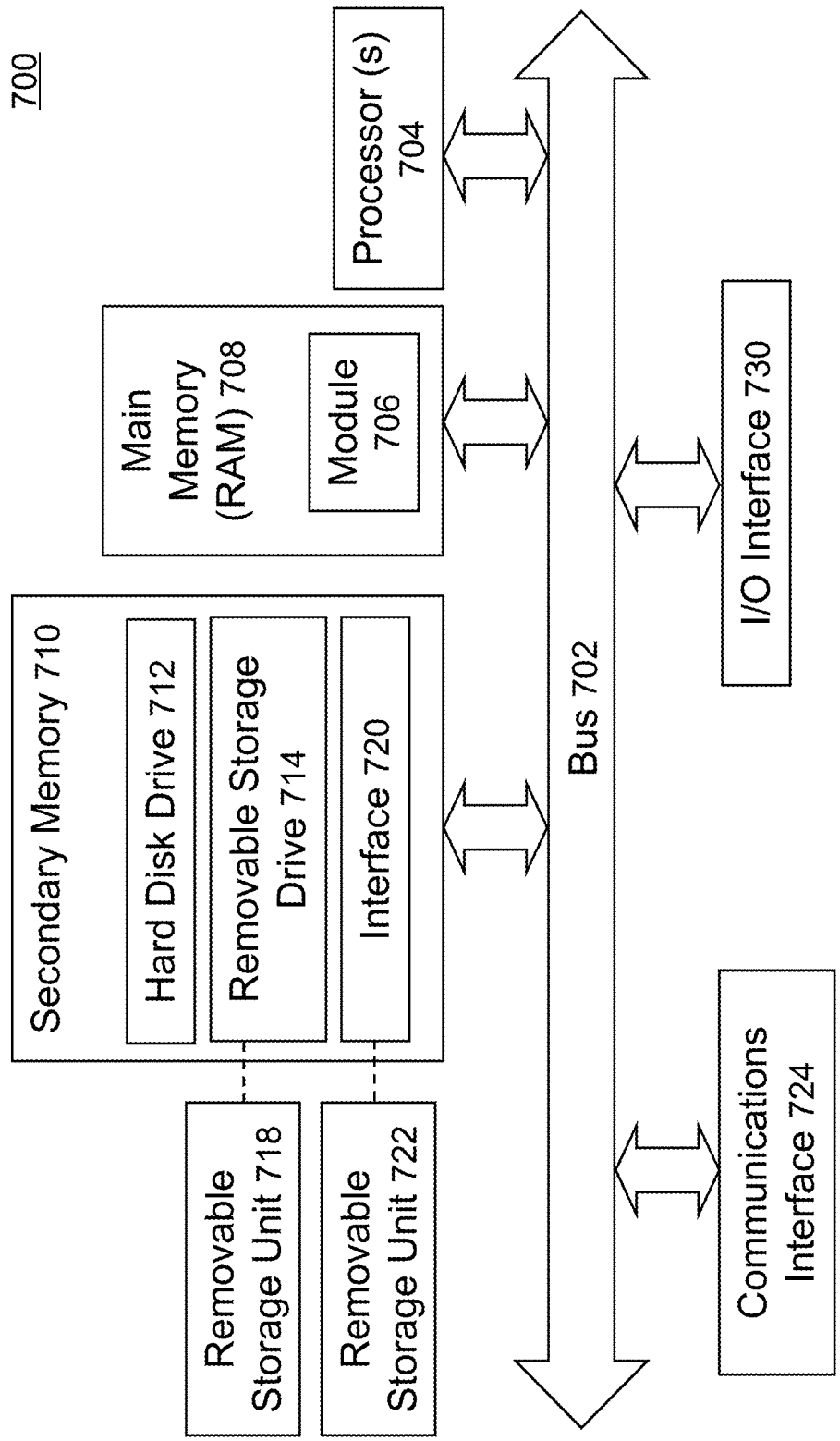
FIG. 7 is a function block diagram showing salient components of an example computer, in which one embodiment of the invention may be implemented.

According to one aspect, the disclosure is directed towards one or more special-purpose programmed computer systems capable of carrying out the functionality described herein. An example of a computer system 700 is shown in FIG. 7. The computer system 700 includes one or more processors, such as processor 704. The processor 704 is connected to a computer system internal communication bus 702. Various software embodiments are described in terms of this example computer system. After reading this description, it will become apparent to a person skilled in the relevant art(s) how to implement the invention using other computer systems and/or computer architectures.

Computer system 700 also includes a main memory 708, preferably random access memory (RAM), and may also include a secondary memory 710. The secondary memory 710 may include, for example, one or more hard disk drives 712 and/or one or more removable storage drives 714, representing a floppy disk drive, a magnetic tape drive, an optical disk drive, etc. The removable storage drive 714 reads from and/or writes to a removable storage unit 718 in a well-known manner. Removable storage unit 718, represents a floppy disk, magnetic tape, optical disk, etc. which is read by and written to by removable storage drive 714. As will be appreciated, the removable storage unit 718 includes a computer readable storage medium having stored therein computer software and/or data.

In alternative embodiments, secondary memory 710 may include other similar means for allowing computer programs or other instructions to be loaded into computer system 700. Such means may include, for example, a removable storage unit 722 and an interface 720. Examples of such may include a program cartridge and cartridge interface (such as that found in video game devices), a removable memory chip (such as an Erasable Programmable Read-Only Memory (EPROM), Universal Serial Bus (USB) flash memory, or PROM) and associated socket, and other removable storage units 722 and interfaces 720 which allow software and data to be transferred from the removable storage unit 722 to computer system 700. In general, Computer system 700 is controlled and coordinated by operating system (OS) software, which performs tasks such as process scheduling, memory management, networking and I/O services.

There may also be a communications interface 724 connecting to the bus 702. Communications interface 724 allows software and data to be transferred between computer system 700 and external devices. Examples of communications interface 724 may include a modem, a network interface (such as an Ethernet card), a communications port, a Personal Computer Memory Card International Association (PCMCIA) slot and card, etc. Software and data transferred via communications interface 724. The computer 700 communicates with other computing devices over a data network based on a special set of rules (i.e., a protocol). One of the common protocols is TCP/IP (Transmission Control Protocol/Internet Protocol) commonly used in the Internet. In general, the communication interface 724 manages the assembling of a data file into smaller packets that are transmitted over the data network or reassembles received packets into the original data file. In addition, the communication interface 724 handles the address part of each packet so that it gets to the right destination or intercepts packets destined for the computer 700. In this document, the terms "computer program medium", "computer readable medium", "computer recordable medium" and "computer usable medium" are used to generally refer to media such as removable storage drive 714 (e.g., flash storage drive), and/or a hard disk installed in hard disk drive 712. These computer program products are means for providing software to computer system 700. The invention is directed to such computer program products.

The computer system 700 may also include an input/output (I/O) interface 730, which provides the computer system 700 to access monitor, keyboard, mouse, printer, scanner, plotter, and the likes.

Computer programs (also called computer control logic) are stored as application modules 706 in main memory 708 and/or secondary memory 710. Computer programs may also be received via communications interface 724. Such computer programs, when executed, enable the computer system 700 to perform the features of the invention as discussed herein. In particular, the computer programs, when executed, enable the processor 704 to perform features of the invention. Accordingly, such computer programs represent controllers of the computer system 700.

In an embodiment where the invention is implemented using software, the software may be stored in a computer program product and loaded into computer system 700 using removable storage drive 714, hard drive 712, or communications interface 724. The application module 706, when executed by the processor 704, causes the processor 704 to perform the functions of the invention as described herein.

The main memory 708 may be loaded with one or more application modules 706 that can be executed by one or more processors 704 with or without a user input through the I/O interface 730 to achieve desired tasks. In operation, when at least one processor 704 executes one of the application modules 706, the results are computed and stored in the secondary memory 710 (i.e., hard disk drive 712). Results of the analysis (e.g., computed curve) are reported to the user via the I/O interface 730 either in a text or in a graphical representation upon user's instructions.

Although the invention has been described with reference to specific embodiments thereof, these embodiments are merely illustrative, and not restrictive of, the invention. Various modifications or changes to the specifically disclosed example embodiments will be suggested to persons skilled in the art. Whereas FEA model has been shown and described as a two-dimensional model, the invention allows three-dimensional FEA model to achieve the same. Furthermore, whereas the curve matching example has been shown and described for matching a strain-stress curve obtained in physical material test, other types of curves may be used, for example, matching a digital image obtained in material test. Additionally, only one reference curve has been shown and described, multiple reference curves may be used as target to be optimized with a set of computed curves, for example, a combined measurement for matching two reference curves can be optimized. In summary, the scope of the invention should not be restricted to the specific example embodiments disclosed herein, and all modifications that are readily suggested to those of ordinary skill in the art should be included within the spirit and purview of this application and scope of the appended claims.

We claim:

1. A method of determining a material model representing physical material test results comprising:
   receiving, in a computer system having at least a finite element analysis (FEA) based application module installed thereon, a reference curve defined with multiple nodes of measured stress-strain data obtained in a physical material test of a specimen;
   creating, with the application module, an FEA model representing the specimen, the FEA model associated with material properties defined by a formula having a set of adjustable coefficients;
   obtaining, with the application module, a number of computed curves, each computed curve defined with multiple nodes of computed stress-strain values in a simulation of the material test using the FEA model based on a corresponding set of adjustable coefficients;
   calculating, with the application module, respective curve difference measurement between said each computed curve and the reference curve using a similarity measure technique that includes trimming off excess end portion said each computed curve to match the reference curve, wherein the similarity measure technique comprises:
      creating an initial set of connectors between each node of said computed curve and a corresponding node of the reference curve based on criteria of the similarity measure technique;
      discarding all end connectors except innermost one at both ends of the reference curve;
      redefining said each computed curve by remeshing inner portion with nodes connected to at least one connector;
      recreating a new set of connectors between each node of said each computed curve and a corresponding node of the reference curve;
      calculating an average distance between said each computed curve and the reference curve, when both ends of the reference curve containing only one end connector;
   determining, with the application module, values for the set of adjustable coefficients of the formula as a material model representing the physical material test results by estimating a minimum of the curve difference measurement parameters in accordance with an optimization technique; and
   determining, based on the material model, additional stress-strain data for the specimen which represents material test results that were not obtained in the physical material test of the specimen.

2. The method of claim 1, wherein said redefining said each computed curve further comprises ensuring same number of nodes for said each computed curve with number of nodes of the reference curve.

3. The method of claim 1, wherein the average distance is sum of lengths of all connectors divided by the number of connectors.

4. A system for determining a material model representing physical material test results comprising:
   a memory for storing computer readable code for at least a finite element analysis (FEA) based application module;
   at least one processor coupled to the memory, said at least one processor executing the computer readable code in the memory to cause the application module to perform operations of:
   receiving a reference curve defined with multiple nodes of measured stress-strain data obtained in a physical material test of a specimen;
   creating an FEA model representing the specimen, the FEA model associated with material properties defined by a formula having a set of adjustable coefficients;
   obtaining a number of computed curves, each computed curve defined with multiple nodes of computed stress-strain values in a simulation of the material test using the FEA model based on a corresponding set of adjustable coefficients;
   calculating respective curve difference measurement between said each computed curve and the reference curve using a similarity measure technique that includes trimming off excess end portion said each computed curve to match the reference curve, wherein the similarity measure technique comprises:
      creating an initial set of connectors between each node of said computed curve and a corresponding node of the reference curve based on criteria of the similarity measure technique;
      discarding all end connectors except innermost one at both ends of the reference curve;
      redefining said each computed curve by remeshing inner portion with nodes connected to at least one connector;
      recreating a new set of connectors between each node of said each computed curve and a corresponding node of the reference curve;
      calculating an average distance between said each computed curve and the reference curve, when both ends of the reference curve containing only one end connector;
   determining values for the set of adjustable coefficients of the formula as a material model representing the physical material test results by estimating a minimum of the curve difference measurement parameters in accordance with an optimization technique; and
   determining, based on the material model, additional stress-strain data for the specimen which represents material test results that were not obtained in the physical material test of the specimen.

5. The system of claim 4, wherein said redefining said each computed curve further comprises ensuring same number of nodes for said each computed curve with number of nodes of the reference curve.

6. The system of claim 4, wherein the average distance is sum of lengths of all connectors divided by the number of connectors.

7. A non-transitory computer readable medium containing instructions which, when executed in one or more processors, perform a method for determining a material model representing physical material test results, the method comprising:
   receiving, in a computer system having at least a finite element analysis (FEA) based application module installed thereon, a reference curve defined with multiple nodes of measured stress-strain data obtained in a physical material test of a specimen;

creating, with the application module, an FEA model representing the specimen, the FEA model associated with material properties defined by a formula having a set of adjustable coefficients;

obtaining, with the application module, a number of computed curves, each computed curve defined with multiple nodes of computed stress-strain values in a simulation of the material test using the FEA model based on a corresponding set of adjustable coefficients;

calculating, with the application module, respective curve difference measurement between said each computed curve and the reference curve using a similarity measure technique that includes trimming off excess end portion said each computed curve to match the reference curve, wherein the similarity measure technique comprises:

creating an initial set of connectors between each node of said computed curve and a corresponding node of the reference curve based on criteria of the similarity measure technique;

discarding all end connectors except innermost one at both ends of the reference curve;

redefining said each computed curve by remeshing inner portion with nodes connected to at least one connector;

recreating a new set of connectors between each node of said each computed curve and a corresponding node of the reference curve;

calculating an average distance between said each computed curve and the reference curve, when both ends of the reference curve containing only one end connector;

determining, with the application module, values for the set of adjustable coefficients of the formula as a material model representing the physical material test results by estimating a minimum of the curve difference measurement parameters in accordance with an optimization technique; and determining, based on the material model, additional stress-strain data for the specimen which represents material test results that were not obtained in the physical material test of the specimen.

8. The non-transitory computer readable medium of claim 7, wherein said redefining said each computed curve further comprises ensuring same number of nodes for said each computed curve with number of nodes of the reference curve.

9. The non-transitory computer readable medium of claim 7, wherein the average distance is sum of lengths of all connectors divided by the number of connectors.

* * * * *